April 12, 1927.　　　W. C. WILLIAMS　　　1,624,818
DIRIGIBLE SPOTLIGHT
Filed Nov. 27, 1925　　　3 Sheets-Sheet 3
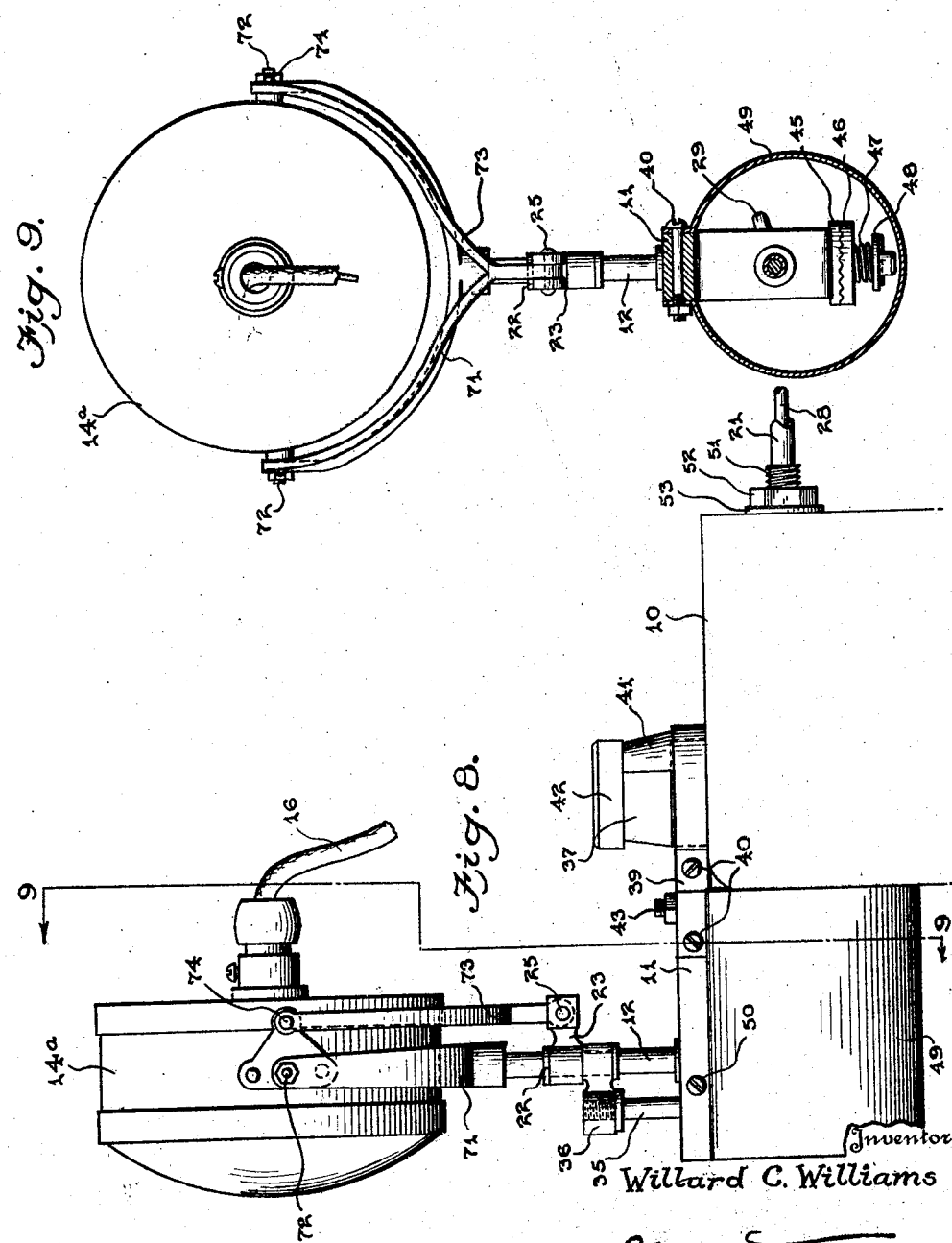

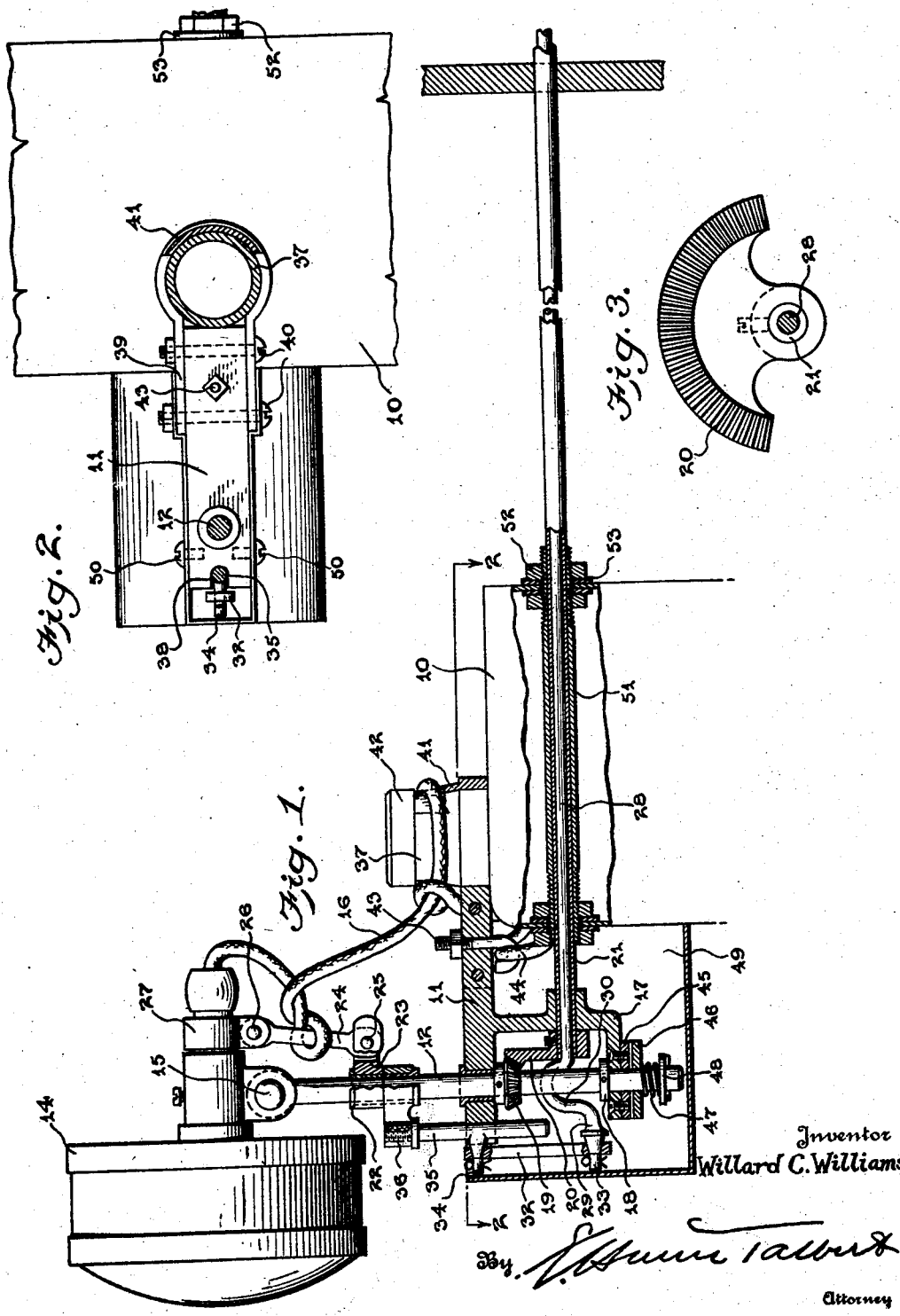

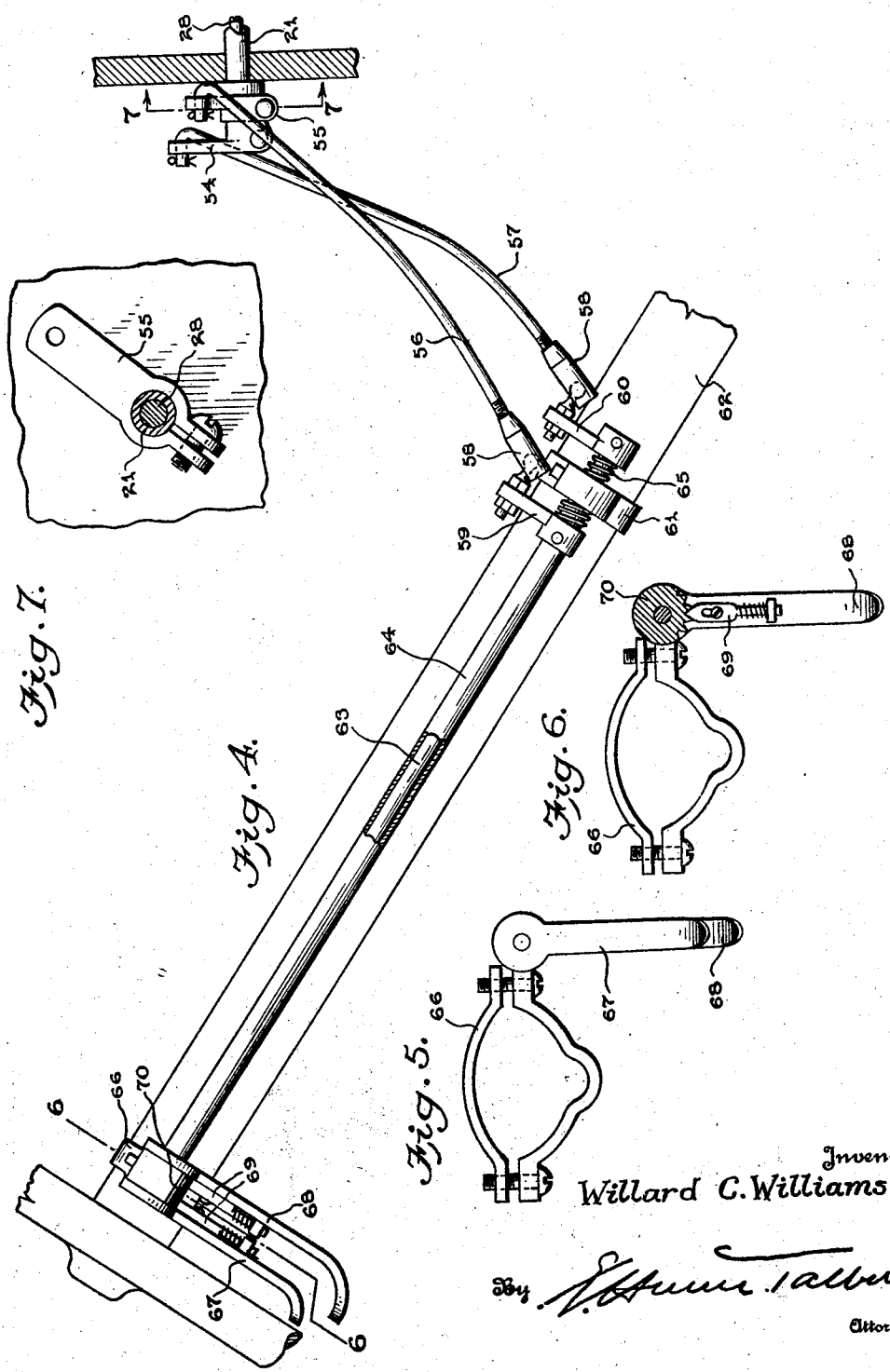

Patented Apr. 12, 1927.

1,624,818

UNITED STATES PATENT OFFICE.

WILLARD C. WILLIAMS, OF INDIANAPOLIS, INDIANA, ASSIGNOR OF ONE-HALF TO JOHN M. PHIPPS, OF INDIANAPOLIS, INDIANA.

DIRIGIBLE SPOTLIGHT.

Application filed November 27, 1925. Serial No. 71,656.

The purpose of the invention is to provide a device of the kind indicated adapted for use in connection with water or air craft, or with vehicles, so that the operator may readily and conveniently direct the light as desired; to provide a construction in which the movement of the light is universal—that is, movable angularly on either a vertical or a horizontal axis or both; to provide a construction in which the angular movements on the two axes may be independently accomplished; to provide a construction which, when used in connection with vehicles, such as automobiles, may be conveniently mounted on the radiator and the control carried by the steering column within convenient reach of the hand of the driver; and to provide a structure of simple construction and therefore susceptible of cheap manufacture and sale.

With this purpose in view, the invention consists in a construction and combination of parts of which a preferred embodiment is illustrated in the accompanying drawings, wherein:

Figure 1 is a view partly in elevation and partly in section, showing the invention applied in operative position on an auto vehicle radiator.

Figure 2 is a sectional view on the plane indicated by the line 2—2 of Figure 1.

Figure 3 is a detail elevational view illustrating the sector gear by means of which angular movement in a horizontal plane is accomplished.

Figure 4 is a side elevational view, partly broken away, showing a portion of a vehicle steering column with the control means operatively mounted thereon.

Figure 5 is a top plan view of the upper clamp for the steering column.

Figure 6 is a sectional view on the plane indicated by the line 6—6 of Figure 5.

Figure 7 is a detail sectional view on the plane indicated by the line 7—7 of Figure 5.

Figure 8 is a side elevational view showing a different form of lamp bracket from that illustrated in Figure 1.

Figure 9 is a sectional view on the plane indicated by the line 9—9 of Figure 8.

Adapted for mounting at any convenient point on the machine with which it is desired to use it, the invention is illustrated as applied for vehicular use, being preferably supported on the radiator 10 by means of the bracket 11 in which the post 12 is rotatably mounted, the latter carrying at its upper end the lamp 14, pivotally connected to the post, as indicated at 15, and supplied with the current necessary for illumination through a cable 16 connected with a convenient point of supply on the vehicle. The bracket 11 is in the form of a forwardly extending metal bar integrally connected with which is a depending angular portion 17 bored for the reception of the lower end of the post, the thrust of the post being taken by a collar 18 bearing upon the upper face of the annular portion 17.

Being mounted for rotary or angular movement on the bracket 11, the post 12, when turned, swings the lamp 14 right handedly or left handedly, depending upon the direction of movement of the post. The means for imparting angular movement to the post comprises a bevel pinion 19 secured to the shaft and abutting the under face of the body portion of the bracket 11. This pinion meshes with a bevel gear sector 20 carried at the forward extremity of a tubular shaft 21, the latter passing through a horizontal bearing eye formed in the vertical wall of the depending angular portion 17 of the bracket. The tubular shaft, when actuated, obviously imparts angular movement to the sector 20 and this, meshing with the pinion 19, will rotate the latter and thus the post 12, swinging the lamp angularly and in a direction corresponding to that in which the shaft 21 is turned.

The pivotal connection 15 between the lamp and the post provides for the angular movement of the former in a vertical plane and that this may be accomplished at a remote point, as from the position of the chauffeur, the post is provided with a sleeve 22. This sleeve snugly fits the post but is capable of both axial movement along the post and angular movement around the latter, although the angular movement is not necessary to the proper functioning of the device. The sleeve 22 carries an arm 23 having an eye through which the sleeve passes. The sleeve may be either fixed to the arm or loosely connected with the latter, since relative movement between the two is not necessary to proper functioning but, if occurring, does not interfere with proper functioning. The arm 23 projects rearwardly and is bifurcated for the reception of the eye of a link 24 which is pivotally connected with the arm, as by a pin 25, the remote end of the link being pivotally connected, as at 26, with a clamping collar 27 connected with the stem of the lamp 14. It is apparent that if the sleeve be moved axially of the post, the lamp 14 will, because of the link connection 24, be oscillated on the pivot 15.

Axial movement of the sleeve is effected by means of a shaft 28 extending axially through the hollow shaft 21, this shaft 28 having a crank 29 at its forward end formed as a terminal of a goose neck 30 provided to permit the necessary angular movement of the shaft 28 without interference from the post 12. The crank 29 is connected with the sleeve by means of a connecting link 32 having a pivotal connection with the crank pin 33 on the crank 29 and with the pin 34 on a guide post 35, the latter being threadingly engaged with the forward end of an arm 36 having an eye similar to that in the arm 23. The sleeve 22 is loosely engaged in this eye of the arm 36, so that angular movement between the arm and sleeve may be had but relative axial movement precluded. When the shaft 28 is operated, the sleeve 22 will be moved axially along the post 12 and the lamp angularly shifted in a vertical plane and it is obvious that this operation may be effected simultaneously with angular movement accomplished in a horizontal plane by the simultaneous operation of the power shaft 21.

The guide post 35 has a bearing in the forward end of the bracket 11, as indicated at 38, the bracket being slotted from the outer end to provide a clearance space for the pin 34. The bracket 11 is preferably supported from the neck 37 of the radiator, a clamp 39 being provided for disposition in surrounding relation to the neck and connection with the bracket, as by bolts 40. The contraction alone of the clamp upon the radiator neck is not relied upon to support the bracket, for the latter is provided with a segmental plate 41 for abutting engagement with the under edge of the radiator cap 42.

As an additional means of support, a J-bolt 43 is employed and connected with the bracket 11, this J-bolt engaging a hook member 44 connected with the radiator in one of the air openings of the latter. Obviously, any tendency of the J-bolt to rock the bracket out of its normal horizontal position is met by the segmental plate 41 engaging the under edge of the filler cap 42.

As a means to preclude rattling of the parts and the vibration of the lamp on its vertical axis, the complemental disks 45 and 46 are provided, the former being secured to the angular portion 17 of the bracket 11 and the latter being carried by the post 12 with respect to which it is axially but not angularly movable. A compression spring 47 surrounds the lower end of the post and bears upon the lower disk, being compressed between it and a washer 48 carried by the post. The disks 45 and 46 are serrated or toothed on their contacting faces and thus angular movement of the post is precluded and rattling or vibration with the post as an axis except when sufficient turning force is imparted to prevent one disk sliding over the other which is possible under such increased force due to the fact that the disk 46 is yieldingly impelled against the disk 45 by the spring 47.

The depending angular portion 17 of the bracket and the forward portions of the shafts 21 and 28, together with the actuating gears and parts, are enclosed by means of a preferably sheet metal housing 49 secured to the upper or body portion of the bracket 11 by means of screws 50 and the bolts 40 which secure the clamp 39 to the bracket.

Being mounted centrally of the radiator and at the forward end of the latter and being designed for actuation from the interior of the vehicle at the driver's seat, it is necessary that the shafts 28 and 21 pass through the radiator and a bearing sleeve 51 is provided for this purpose, this bearing sleeve being threaded at the extremities and receiving the nuts 52 disposed exteriorly and interiorly of the radiator and having gaskets 53 interposed between them and the radiator wall to preclude leaks at the opening made for the reception of the bearing sleeve.

The shafts 28 and 21 extend to the interior of the vehicle, receiving on their extremities respectively the arms 54 and 55 with which the extremities of the connecting rods 56 and 57 are pivotally connected. These connecting rods at the remote ends have universal connections 58 with the arms 59 and 60 disposed respectively above and below a bearing bracket 61 clamped to the steering column 62. The bearing in the bracket 61 supports the lower end of a shaft 63 with which the arm 60 is connected but the arm 59 is connected to the lower end of a tubular shaft 64 surrounding the shaft 63 and in order to preclude rattling of the two shafts, the shaft 63 has disposed in surrounding relation to it the compression springs 65 abutting respectively the lower end of the shaft 64 and side of the arm 59 and the upper side of the arm 60, the springs bearing on opposite sides of the bearing bracket 61.

At the upper end of the steering column a second bracket 66 is provided having a bearing for the shaft 63, this shaft being connected with an actuating lever 67 disposed on top of the bearing while the shaft 64 is connected with a similar lever 68 disposed against the lower face of the bearing. Both levers are provided with spring actuated latches 69 engaging toothed sectors 70, so that angular positions of the arms may be maintained. The levers 67 and 68 are disposed below but adjacent to the steering wheel and are, therefore, readily accessible and either one may be actuated separately or both together and obviously the desired movement of the lamp may be effected by the proper movement of either or both levers.

In the construction shown in Figures 8 and 9, the structure is modified to show the method of use as when the lamp, such as the lamp 14ª, is provided with diametrically opposite trunnions. In this construction, the post 12 carries at the upper end a fork 71, the extremities of whose arms are pivotally connected with the trunnions, as at 72. Thus, the lamp may be moved angularly in a vertical plane. In this construction, the link 24 is replaced with a bail 73 pivotally connected with the lamp on diametrically opposite sides, as indicated at 74, this bail having a pivotal connection with the arm 23 identical with the connection between the link 24 and said arm 23.

The invention having been described, what is claimed as new and useful is:

1. A device for the purpose indicated comprising a lamp, a post at the upper end of which the lamp has a horizontally disposed pivotal connection to permit of its angular movement in a vertical plane, a bracket in which the post is mounted for angular movement in a horizontal plane, an actuating shaft having a geared connection with the post for effecting its angular movement in the bracket, a member carried by the post and axially movable of the latter, said member having a link connection with the lamp, and a second actuating shaft having a terminal crank and a link connection with said member.

2. A device for the purpose indicated comprising a lamp, a post at the upper end of which the lamp has a horizontally disposed pivotal connection to permit of its angular movement in a vertical plane, a bracket in which the post is mounted for angular movement in a horizontal plane, an actuating shaft having a geared connection with the post for effecting its angular movement in the bracket, a member carried by the post and axially movable of the latter, said member having a link connection with the lamp, and a second actuating shaft having a terminal crank and a link connection with said member, the first said actuating shaft being of tubular form and disposed in surrounding relation to the second actuating shaft.

3. A device for the purpose indicated comprising a lamp, a post at the upper end of which the lamp has a horizontally disposed pivotal connection to permit of its angular movement in a vertical plane, a bracket in which the post is mounted for angular movement in a horizontal plane, an actuating shaft having a geared connection with the post for effecting its angular movement in the bracket, a member carried by the post and axially movable of the latter, said member having a link connection with the lamp, a second actuating shaft having a terminal crank and a link connection with said member, the first said actuating shaft being of tubular form and disposed in surrounding relation to the second actuating shaft, and a sheet metal housing member carried by said bracket and enclosing the terminals of said shafts and the operative connection between the latter and the post and said member.

4. In combination with the steering column and radiator of an auto vehicle, a bracket having a clamping engagement with the neck of the radiator and projecting forwardly of the latter, a post mounted vertically in said bracket and angularly movable on its vertical axis, a lamp having a horizontally disposed pivotal connection with the post at the upper end the latter, a member carried by the post and axially movable of the latter and having a link connection with a lamp eccentrically of said pivotal connection, a bearing sleeve extending through said radiator, a plurality of actuating shafts of which one is tubular and disposed in surrounding relation to the other, said tubular shaft being journalled in said bearing, an operative connection between the tubular shaft and the post, an operative connection between the other shaft and said member, a plurality of shafts paralleling the steering column and having bearings carried by the latter, said shafts being operatively connected one to each of said operating shafts, and hand levers carried by the steering column shafts and at the upper ends of the latter and in close proximity to the steering wheel.

5. In combination with the steering column and radiator of an auto vehicle, a bracket having a clamping engagement with the neck of the radiator and projecting forwardly of the latter, a post mounted vertically in said bracket and angularly movable on its vertical axis, a lamp having a horizontally disposed pivotal connection with the post at the upper end of the latter, a member carried by the post and axially movable of the latter and having a link connection with the lamp eccentrically of said pivotal connection, a bearing sleeve extending through said radiator, a plurality of actuating shafts of which one is tubular and disposed in surrounding relation to the other, said tubular shaft being journalled in said bearing, an operative connection between the tubular shaft and the post, an operative connection between the other shaft and said member, a plurality of shafts paralleling the steering column and having bearings carried by the latter, said shafts being operatively connected one to each of said operating shafts, hand levers carried by the steering column shafts and at the upper ends of the latter and in close proximity to the steering wheel, said column carried shafts being disposed one in surroundig relation to the other, and an anti-rattling device operatively connected with said column carried shafts.

6. In combination with the steering column and radiator of an auto vehicle, a bracket having a clamping engagement with the neck of the radiator and projecting forwardly of the latter, a post mounted vertically in said bracket and angularly movable on its vertical axis, a lamp having a horizontally disposed pivotal connection with the post at the upper end of the latter, a member carried by the post and axially movable of the latter and having a link connection with the lamp eccentrically of said pivotal connection, a bearing sleeve extending through said radiator, a plurality of actuating shafts of which one is tubular and disposed in surrounding relation to the other, said tubular shaft being journalled in said bearing, an operative connection between the tubular shaft and the post, an operative connection between the other shaft and said member, a plurality of shafts paralleling the steering column and having bearings carried by the latter, said shafts being operatively connected one to each of said operating shafts, hand levers carried by the steering column shafts and at the upper ends of the latter and in close proximity to the steering wheel, said column carried shafts being disposed one in surrounding relation to the other, and an anti-rattling device operatively connected with said column carried shafts, the operating levers of said last named shafts being provided with spring actuated latches.

In testimony whereof he affixes his signature.

WILLARD C. WILLIAMS.